Oct. 14, 1958 C. R. SACCHINI ET AL 2,855,615
CLUTCH MECHANISMS FOR THREAD CUTTING MACHINES
Filed July 26, 1954 2 Sheets-Sheet 1
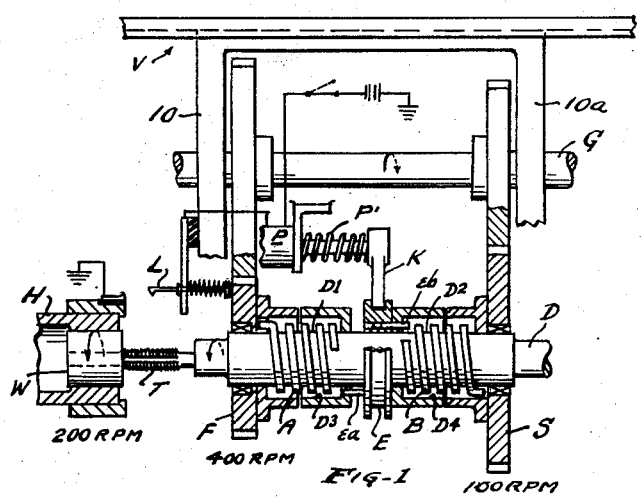
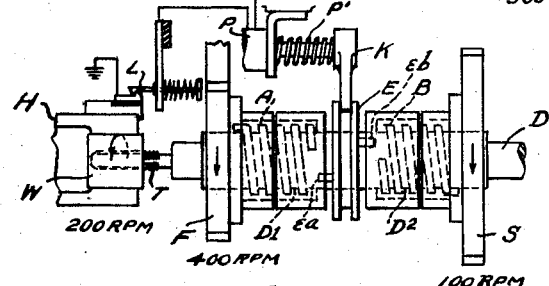
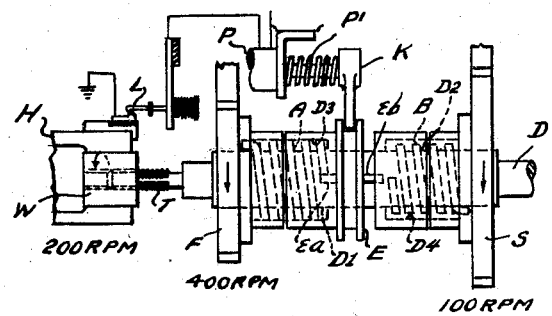
INVENTORS
C. R. SACCHINI
D. R. TOMKO
BY
ATTORNEY INVENTORS
C. R. SACCHINI
D. R. TOMKO
BY
George M. Soule
ATTORNEY

United States Patent Office 2,855,615
Patented Oct. 14, 1958

2,855,615

CLUTCH MECHANISMS FOR THREAD CUTTING MACHINES

Columbus R. Sacchini, Willoughby, and Donald R. Tomko, Cleveland, Ohio, assignors, by mesne assignments, to Curtiss-Wright Corporation, Marquette Metal Products Division, Cleveland, Ohio, a corporation of Delaware Application July 26, 1954, Serial No. 445,752

8 Claims. (Cl. 10—136)

The invention relates principally to a helical coil type clutch mechanism assembly (spring clutch) adapted for effecting relative angular motion of a work holder and a screw thread cutting tool such that all rotary elements turn continuously or in any event do not require reversing in order to disassociate the tool and work after the thread cutting operation has been performed. The invention is illustrated as applied to an automatic tapping machine.

In the herewith schematically illustrated form or type of tapping machine a primary rotary element supports the work, a secondary rotary element is shown as a tapping spindle, and two reaction members, through the agency of automatically operating control mechanism partially shown herewith but of a well known type, are coupled selectively with the tap spindle through coil clutches to cause the work to overrun the spindle for part of the cycle and the spindle to overrun the work for substantially the remaining part. The relative overrunning speeds should be so interrelated that extraction of the tap from the work is accomplished at faster relative speed of tap and work than obtains while the tap is entering the work. The involved rotational speeds particularly when the loads are light (as for tapping small diameter holes in soft metal) can become quite high and the loads vary greatly with tap diameter. Accordingly, in order to arrange helical coil clutches for use in automatic tapping machines, unusual provision must be made for positive control (energization and de-energization of the coils), prevention of possibility of self energization of the coils at improper times, such as can occur from various causes, and provision must be made for always securing the necessary reactance forces for energization of the coils into locking position regardless of large variations in work load. The principal objects of the invention are indicated by the foregoing discussion. Other objects will become apparent from the following description of the herewith disclosed embodiments.

Figure 5:
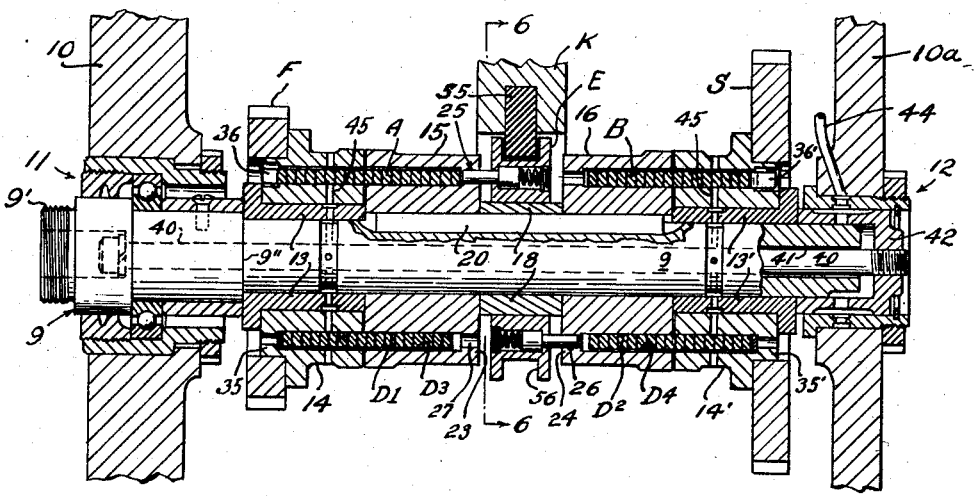
Figure 7:
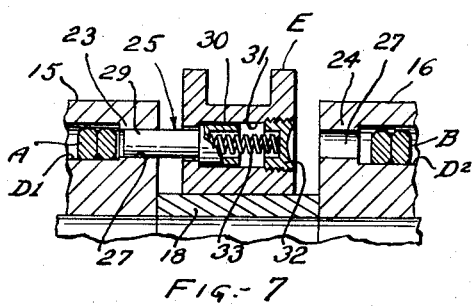
Figure 6:
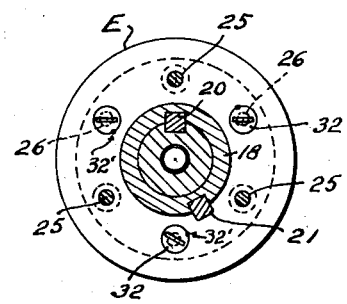
Figure 8:
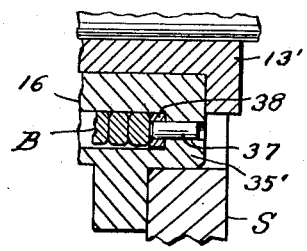

In the accompanying drawings, Figs. 1, 2 and 3 are diagrammatic views showing, in greatly simplified form, the principal elements of the clutch mechanism hereof arranged for right hand thread tapping, and portions of an illustrative or typical control system for the mechanism, each of the views showing a different portion of the operating cycle from start to finish of tapping. Fig. 4 is a view corresponding to Fig. 2 but showing the mechanism as modified or arranged for tapping left hand threads. Fig. 5 is a longitudinal cross sectional view of the tapping spindle and clutch assembly as actually constructed and arranged for right hand thread tapping. Fig. 6 is a transverse cross sectional view taken approximately as indicated at 6—6 in Fig. 5. Fig. 7 is a relatively enlarged fragmentary sectional view of one portion of an actuator or energizer mechanism for one clutch spring, the plane of the view corresponding to that of Fig. 5. Fig. 8 is a similar detail sectional view, in the same scale as Fig. 7, taken approximately at right angles to the plane of Fig. 5 and showing an axial support or positioner for the anchored end of one of the clutch springs.

In the diagrams, Figs. 1 to 3, the tool spindle of a machine tool suitable for cutting screw threads is represented as a shaft D which is supported in a rigid housing partially shown at 10, 10a and arranged for operation by a main drive shaft G in the housing. Shaft G, during operation of the machine tool, turns continuously in the indicated direction. Spindle D carries a right hand thread cutting tool (tap) T at one end. Work holder H for workpiece W is represented as a rotary sleeve coaxial with the tool spindle. The work holder is continuously turned in the direction of the arrow shown on W. The machine tool has a suitable work changing means or feeder (not shown) associated with the work holder H; a slide supporting either the work driving or the tool driving mechanism (slide for the latter being indicated at V) for enabling the tap and work to move relatively on their common axis for tap feed up to and away from the work, and power mechanism (not shown) to rotate shaft G and work holder H. The work could, of course, be carried on spindle D by reversal of the illustrated work and tool positions.

In Fig. 1 the sectionally shaded relatively adjacent components of the spring clutch mechanism which turn with each other are similarly cross hatched. For example the parts which are constrained to turn with the spindle D are shaded by lines leaning to the left. Reaction members, shown as gear wheels F and S in constant mesh with gear wheels of shaft G, are suitably journaled to turn relative to the tool spindle D. For demonstration purposes only, the gears F and S and the workholder H will be assumed to have the speeds (200 R. P. M. etc.) as indicated on the drawing, all in the same direction (per arrows). Helical clutch springs A and B, exaggeratedly shown, are each positively secured at one end to a respective gear F or S, as is self evident. The free end coils of the springs are preloaded against or in interference fitting relationship to respective external drum surfaces D1 and D2 which turn with spindle D. Both clutch springs are wound as right hand helices, and the indicated speeds and directions are such that, during operation of the machine tool the springs overrun at times on the external drum surfaces. Surrounding the free end coils of respective springs A and B are internal drum surfaces D3 and D4 which also turn with the spindle. The external surfaces of the free end coils of the springs A and B are normally maintained centered with and in slightly spaced relation to the internal drum surfaces by the preloading mentioned above.

Slidable on the spindle D (splined or keyed thereto) is a spring actuator or energizer collar E. The collar slidably carries two sets of energizer pins $ea$ and $eb$ only one of each being shown. When the pins are shifted selectively into the paths of rotation of the extremities of respective free end coils of the clutch springs A and B, the spring coils are expanded into gripping relationship to the associated internal drum surfaces, e. g. D3 and D4, thus locking one or the other of the reaction members F and S to the tool spindle to establish the desired tool spindle speeds for tapping and untapping as will be more fully explained under "Operation."

As an easily schematically illustrated arrangement to automatically control the position of the actuator collar E and its energizer pins, a mainly electrical means is shown. This includes an electrical solenoid P the armature of which is connected to the collar E by means of an arm or yoke K. The solenoid shifts the collar to the left, see Figs. 2 and 3, when each tapping operation has been completed. A spring P' acts against yoke K to automatically shift the collar E to the right (see Fig. 1) when the solenoid is deenergized. A self latching contactor switch L is shown in the solenoid circuit for establishing current to the solenoid P when tapping of each workpiece W has proceeded the desired distance (see Fig. 2). Contactor L, as schematically shown, is assumed to be slidably mounted on the spindle housing 10, 10a, and is spring biased to the right. As will be evident, the latch enables current to continue to be supplied to the solenoid P until untapping has been completed. Untapping relative motion between work and tap (or, alternatively, the operation of inserting a new work piece) finally separates the temporarily latched electrical contact points; and the actuator collar E is immediately returned to its Fig. 1 illustrated position by spring P' for recommencement of the operating cycle.

In the actual physical arrangement for right hand tapping (Figs. 5 through 8), spindle D is partly represented as a shaft 9 supported for rotation in the mutually rigid housing members 10, 10a on bearing assemblies 11 and 12. The tool holder or clutch (not shown) is removably attached to the enlarged left hand end of shaft 9, shown threaded at 9'. Identical bearing bushings 13 and 13' provide supports for the reaction wheels F and S on the shaft 9 through the intermediary of operatively identical spring anchor hubs or drum members 14 and 14' to which the gear wheels F and S are detachably secured as by screws, not shown. The internal and external clutch drum surfaces around the "free end" or unattached coils of clutch springs A and B are supported on drum members 15 and 16 keyed or splined to the shaft 9 and held in properly spaced position partly by a rigid sleeve 18 on the shaft. A conventional key 20, as shown, couples the drum members 15 and 16 and the spacer 18 with the shaft 9 for rotation therewith. The energizer collar E is shown, in Fig. 6 only, as similarly keyed at 21 to the spacer sleeve 18. The external clutch drum surfaces (D1 and D2, same as in Figs. 1–3) and the corresponding internal drum surfaces, D3 and D4, are defined in part by annular end wall portions 23 and 24 of the respective drum members 15 and 16, which end wall portions 23 and 24 have axial openings 27 to guide and support the two sets of spring energizer pins. In Figs. 5, 6 or 7 the pins of one set are designated 25 and those of the other set 26, all being of substantially identical construction. As indicated in Fig. 6, there are preferably three equally angularly spaced energizer pins 25 and three similarly spaced energizer pins 26. The openings 27 of end wall portions 23 and 24 slidably receive respective relatively reduced diameter end portions 29 of the pins 25 or 26 for projection of pin portions 29 selectively into the transverse planes of shoulders provided by the end surfaces of the free end coils of the clutch springs A or B.

The actuator collar E is enabled to perform its full movement from each of its spring energizing positions into the opposite position, wherein one of the energizer pins 25 (or 26) will be properly related to the associated clutch spring end shoulder, through provision of axial yield of whichever of the pins encounter or encounters the axially facing helical surface of the end coil of the spring. As shown, particularly by Fig. 7, pin 25 has an enlarged head portion 30 freely slidable in a counterbore 31 of collar E, the bottom or axial end of the counterbore serving to limit the distance the energizer pin can project toward the associated clutch spring when the collar is shifted to its active positions in which it abuts the drum members 15 or 16. Further, as shown in Fig. 7, a screw plug 32 occupies the outer end of counterbore 31 and a compression spring 33 is interposed between the head of the pin 25 and the plug 32. All of the screw plugs are staked in place as at 32', Fig. 6. The springs 33 are axially preloaded between the pins 25 and their screw plugs in suitable position-retaining sockets of the pins and plugs, as fully illustrated.

Preferably the reduced diameter portion 29 and the head 30 of each of the pins 25 and 26 are made much smaller in diameter than the receiving bores and counterbores of collar E, so that, in event of slight misalignment of the pin-receiving holes in the collar E with the corresponding guide bores 27 in the drum members 15 and 16, there will be no possibility of the energizer pins being restrained as by friction against free axial movement in the collar E. The pin end portions 29 have freely sliding but fairly close fit in the guide bores 27 of respective drum members 15 and 16, so that the free ends of the pins, as projected into the paths of the clutch spring end shoulders, will be as firmly laterally supported as is practicable.

As partially shown in Fig. 5, the shifter fork or yoke of actuator arm K is preferably a C-shaped block 55 of tough so called "plastic" material loosely embracing the peripheral groove 56 of collar E.

Referring to the clutch spring anchoring and supporting hubs or drum members 14 and 14', Fig. 5, these are substantially identical with each other and are quite similar in construction to the clutch drum members 15 and 16, in that they have external and internal cylindrical supporting and coil-grip-receiving drum surfaces for associated coils of the clutch springs A and B, which drum surfaces of members 14 and 14' are of the same diameters as positionally corresponding drum surfaces of drum members 15 and 16. End wall portions 35 and 35' of clutch spring anchoring drum members 14 and 14' have axial openings therethrough, one of each of which is especially shaped to receive a so called spring "toe" or an axial lug 36 or 36' on the associated clutch spring as a positive connection with the spring; and one of each of the openings (see Fig. 8) receives a retaining pin 37 for a spring end coil positioning "helix plate" 38 of conventional construction, partially shown in Fig. 8. Others of the axial holes in wall portions 35 and 35' are useful in receiving knock-out or extractor pins (not shown) for enabling the clutch springs A and B and their helix plates 38 to be removed from the cavities of the anchoring drum members 14 and 14'.

It is important to minimize the axial distance between each co-operating set of drum members 14, 15 and 14', 16 (spring cross-over region) while preventing the juxtaposed end surfaces of those members from rubbing upon and wearing each other. For that purpose bushing 13, left Fig. 5, is made slightly longer than anchoring drum member 14, and the bushing 13' is similarly related in length to drum member 14'. Bushing 13 is shouldered against spindle shaft 9 at 9", and a bolt 40 reaches through an axial bore 41 in the spindle for enabling the various parts of the assembly, exclusive of drum members 14 and 14' and parts connected thereto, to be clamped axially together into a rigid unit by a tubular nut 42 (right Fig. 5) threaded on bolt 40. The nut 42 is part of the bearing assembly 12, and said nut is shown in axial abutment with bushing 13'. Thus the drum members 14 and 14' are enabled to turn freely relative to the spindle assembly (neglecting overrunning friction of the clutch springs on drum members 15 and 16) and constant desirably narrow spring cross-over gaps between each pair of drum members are established.

Provision for lubricating the working parts of the assembly, especially the clutch springs A and B and their coacting drum surfaces, mainly to keep them clean of solid and highly viscous or stickly foreign matter such as could otherwise cause self energization of the clutch springs, comprises a supply tube 44 (right Fig. 5) for oil under substantial pressure and various channels including a fairly large clearance space between bolt 40 and its receiving bore 41 in the spindle shaft. As will be apparent from the drawing each clutch-spring-containing pocket or cavity in the four drum members 14, 14', 15 and 16 receives oil from said clearance space 41 through radial distributor holes and communicating grooves (generally not indicated, being of well known construction) in the various relatively rotating parts. The radial holes or oil passages 45 in drum members 14 and 14' can, advantageously, be plugged (radially outwardly from the clutch springs) to insure supplying of oil under substantial pressure to the free end coils of the clutch springs and for lubrication and cleansing of the acting end portions 29 of energizer pins 25 and 26 and their their guide bores in drum members 15 and 16. Three of the holes 27 which are provided in each drum member to receive the clutch spring energizer pins 25 and 26 are unoccupied (see Fig. 7 showing one such opening) thereby enabling free outlet for the oil.

Operation (right hand thread tapping)

Referring first to Fig. 1, the already identified parts of the mechanism are shown in start-tapping relationship or at the instant the tap T has been brought into contact with workpiece W. Slow speed reaction member (gear S) is now turning the tap spindle D at 100 R. P. M. counterclockwise (looking at gear S from right toward left) through the inherent self-energized gripping action of clutch spring B on its associated external drum surfaces, particularly D2. Meanwhile it will be apparent that clutch spring A overruns on external drum surface D1 of the tap spindle assembly since the turning of reaction gear F faster than the spindle D in the same direction as the spindle is turning tends to unwind or expand the clutch spring A. As the work W, turning faster than the tap, encounters the tap, the resistance to cutting of the right hand threads operates, through the tap and spindle D, to cause energizer pin eb (angularly rigid with spindle D) to overtake the free end shoulder of clutch spring B and expand that spring (not illustrated) against its associated internal drum surfaces of both associated drum members (cf. Fig. 5, drums 14' and 16), frictionally locking the gear S to the spindle. Thus (with the indicated speeds) tapping takes place at an effective speed (W/T) of 100 R. P. M. If the tap T, by reason of having completely formed all possible threads in the workpiece W, then has much less reaction torque transmitted to it frictionally by the workpiece than was the case during thread cutting there will still be enough friction between the mutually contacting surfaces of the work and tap, aided by the momentum of the spindle and connected parts, to maintain clutch spring B in its expanded position as long as energizer pin eb is in its Fig. 1 illustrated position axially of the spindle assembly. Referring back to the self energizing operation of clutch spring B on its external drums at start of tapping, it will be observed that such operation avoids initial contact between the tap and the work at the high relative speed which would have obtained had the spindle not been positively so turned by gear S and its connected clutch.

Fig. 2 shows the condition obtaining when tapping has proceeded to the desired point, at which time actuator E is automatically being moved rapidly to the left through its illustrated neutral position by the already described control means or its operating equivalent (solenoid P now energized as is apparent). At the instant the energizer pin eb is withdrawn from contact with clutch spring B that spring contracts toward and upon its external drums, overrunning thereon and permitting the rotational speed of spindle D to accelerate to the rotational speed of the work W (accomplished by work and tap frictional contact). The overrunning drag or friction of clutch spring B on spindle-connected drum surface D2 has little or no restraining influence tending to prevent the spindle D from attaining the speed of the work W, such drag being practically offset or cancelled by overrunning of clutch spring A on spindle-connected drum surface D1 in a relatively opposite direction (aiding the acceleration of spindle speed).

In Fig. 3 the actuator collar E has completed its movement necessary to bring energizer pin ea into the path of the coacting end shoulder of clutch spring A, causing expansion of that clutch spring into locking frictional contact with its associated internal clutch drums and extraction of the tap T from work W by causing overrunning of the tap spindle relative to the work, as will be evident. With the indicated speed of reaction gear F the tap is extracted at twice the effective speed (W/T) as obtained for tapping.

Arrangement for left hand tapping

In Fig. 4, which shows schematically the mechanism substantially as described above but arranged for use in forming left hand screw threads (i. e. tapping) the fast and slow reaction members F' and S' in Fig. 4, are relatively reversed in position, and left hand wound springs A' and B' are substituted for the right hand wound springs of Figs. 1 through 3 and Fig. 5. In order to obtain the same, already described, speed relationship between the thread cutting and tool-ejection portions of the cycle (tap-in and tap-out) without having to change any of the gear sizes it is necessary to increase the rotational speed of the work over that which is used per Figs. 1 through 3. As shown the reaction gear members F' and S' are indicated as turning at 400 R. P. M. and 100 R. P. M. respectively, and the work is indicated as turning at 300 R. P. M. The same essential result would be obtained if the work turned at 200 R. P. M.; reaction gear F' turned at 300 R. P. M., and a reaction member in the position of gear S' were to have "zero speed" (not illustrated). The same directions and sequence of operation of the controls (actuator collar E and the rest) apply for left hand thread tapping (e. g. per Fig. 4) as for right hand thread tapping.

Operation (left hand thread tapping)

Assuming the tap spindle D, as shown in Fig. 4, is being restrained by its inertia against turning (since the frictional overrunning drag of spring A' on its external spindle drum may be considered to be fully as effective as that of clutch spring B' on its external spindle drum, wherefore the net torque, theoretically at least, is zero), it will be seen that when the actuator collar E is shifted to the right, so that one of its energizer pins eb is in the path of rotation of clutch spring B', the rotation of reaction gear F' will bring the free end of spring B' into contact with such energizer pin (illustrated condition) expanding spring B' and locking the tap spindle D to gear F'. No reaction force by the work on the tap is needed in order to commence tapping in this case, and the controls are so designed or adjusted that contact between the tap and work occurs after complete lockup of the spring B' clutch in its internal drums. Clutch spring A', during tapping, overruns on its external spindle-connected drum D1 and the left hand thread cutting tap T' in effect overtakes the work W', tapping it at an effective tapping speed (W'/T') of 100 R. P. M. When the actuator collar E (Fig. 4) is shifted to the left through the neutral position corresponding to the one illustrated by Fig. 2, during which instant of passing through neutral the spindle and tap will be free to decelerate toward the slower speed of the work (which deceleration is permitted by overrunning of clutch spring B' on drum D2 and is assisted by overrunning drag of clutch spring A' on external drum D1) sufficient rotation of the spindle will be maintained through friction between the tap and work so that one of the energizer pins ea will act to expand the spring A' against its internal drums, locking the tap spindle to the reaction member S'. Once such locking has occurred, the tap is extracted at an untapping speed relative to the work equal to the rotational speed of the work minus the effective speed of the tap or (e. g.) 200 R. P. M. same as was described in connection with right hand thread tapping. When untapping is commenced, any subsequent reduction of friction between the contacting surfaces of tap and work to a point such that clutch spring A' is allowed to contract is inconsequential since the inertia of the spindle assembly would then be sufficient to enable completion of the untapping operation.

In each of the above described operating conditions (Figs. 1 through 4), such that one of the clutch springs is expanded into contact with its internal drums, it is of vital importance that the other clutch spring remain contracted out of effective contact with its associated internal drums. The degree or amount of radial preloading of the clutch springs on their external drums is so selected as to resist any possible effect of centrifugal force at estimated top speeds tending to expand the springs toward the point of becoming self energizing in the internal drums. Since such self energizing could also take place if, for example, sticky matter or grit were to become embedded on one of the internal spindle-connected drum surfaces around the free end coils of the associated clutch spring, it is equally important to guard against accumulations of foreign matter in the clutch spring pockets. Oil supplied under pressure to the clutch springs and their containing spaces in the manner shown herewith and described above effectually prevents such accumulations from occurring by reason of continual flushing of the critical spaces during operation of the tapping machine. The clutch spring energizing mechanism hereof is so arranged as to provide for positive selective energizing of the two clutch springs notwithstanding the possibility of sticking of one or even two of the energizer pins of either set (25 or 26) in retracted positions as through failure of compression springs 33 to overcome restraining friction; and, in the described construction, likelihood of frictional restraint of movement of the energizer pins in their guides has been reduced to a practical minimum.

We claim:

1. In a machine tool adapted to cut screw threads, a rotary primary member which turns unidirectionally at a constant speed, a rotary secondary member in axial alignment with the primary member, one of said members rotatably supporting the work and the other rotatably supporting a thread cutting tool, one of said members having a guide on which that member can move toward and away from the other member along the common axis of the members for enabling tool feed relative to the work, two reaction members co-axial with the secondary member, means constantly operating to rotate one of the reaction members relative to the other, said means acting to maintain a constant overrunning and underrunning rotational speed relationship between respective reaction members and the primary member, two helical clutch springs each secured at one end to a respective reaction member, the secondary member having two pairs of mutually rigid internal and external concentric drum surfaces in common transverse planes turning with the secondary member, each pair being in telescoping relationship with coils adjacent the free end of a respective spring and one element of each pair being normally in peripheral contact with adjacent surfaces of the associated coils whereby to maintain the radially opposite surfaces of those coils out of contact with the other element of the pair, the said coils of each spring being movable into locking clutching relationship to said other element of its associated pair of drum surfaces, spring energizing means turnable with the secondary member and capable of selective operative engagement with free end coils of the two springs at different times whereby, at one time, to cause said coils of one spring to move radially into locking frictional engagement with its associated other element for effecting overrunning of the secondary member relative to the primary member and, at another time, to cause said coils of the other spring so to move in respect to its associated other element for effecting an underrunning relationship between the secondary member and primary member.

2. In a machine tool adapted to cut screw threads, a rotary work holding member which turns unidirectionally at a constant speed, a rotary tool spindle member in axial alignment with the work holder, one of said members having a guide on which that member can move toward and away from the other member along the common axis of the members for enabling tool feed relative to the work, two reaction members coaxial with the spindle member, the reaction members being rotatable relative to each other and the work holder on the spindle axis, means acting on the reaction members to maintain a fixed rotational speed relationship therebetween and fixed overrunning and underrunning rotational speed relationships between respective reaction members and the work holding member, two helical clutch springs each secured at one end to a respective reaction member, the spindle member having two pairs of mutually rigid internal and external clutch drum surfaces in common transverse planes turning with the spindle member, each pair being in telescoping relationship with coils adjacent the free end of a respective spring, the just mentioned coils of each of the springs being normally in preloaded frictional relationship to one drum surface of its associated pair of drum surfaces such as will resist while not preventing rotary movement of the spindle member in one direction relative to respective reaction members, the normally preloaded coils of each spring being movable into locking clutching relationship to the other drum surface of its associated pair of drum surfaces, spring energizing means turnable with the spindle member and capable of selective operative engagement with free end coils of the two springs at different times whereby, at one time, to cause the normally preloaded coils of one spring to move radially into locking frictional engagement with its associated other drum surface for effecting overrunning of the spindle member relative to the work holder, and, at another time, to cause the normally preloaded coils of the other spring so to move in respect to its associated other drum surface for effecting an underrunning relationship between the spindle member and work holder.

3. In a machine tool adapted to cut screw threads, a rotary work holding member which turns unidirectionally at a constant speed, a rotary tool spindle member in axial alignment with the work holder, one of said members having a guide on which that member can move toward and away from the other member along the common axis of the members for enabling tool feed relative to the work, two rotary driving members coaxial with the spindle member, means to impart rotation to the driving members unidirectionally at fixed relatively different speeds, one underrunning the work holding member and the other overruning that member, two identically wound helical clutch springs each secured at one end for rotation with a respective driving member, the spindle member having two pairs of mutually rigid internal and external drum surfaces in common transverse planes turning with the spindle member, each pair in telescoping relationship with coils adjacent the free end of a respective spring, said coils being normally in preloaded frictional relationship to one drum surface of its associated pair, the same normally preloaded coils of each spring being movable into clutching relationship to the other drum surface of the associated pair of drum surfaces, and a spring energizing device mounted to turn with the spindle member while being movable axially thereof, the energizing device including shoulders positioned and arranged selectively to engage terminal shoulders of respective spring end coils circumferentially of those coils so as to cause the said normally preloaded coils of the so engaged spring to move radially into said clutching relationship to its associated other drum surface, whereby the tool spindle member can be locked to the slower turning one of the driving members to cause the tool to underrun the work for cutting threads thereon and locked to the faster turning driving member to cause the spindle member to overrun the work for disassociation of the tool and work.

4. In a machine tool adapted to cut screw threads, a rotary primary member which turns unidirectionally at a constant speed, a rotary secondary member in axial alignment with the primary member, one member supporting work and the other supporting a thread cutting tool, one of said members having a guide on which that member can move toward and away from the other member along the common axis of the members for enabling tool feed relative to the work, two reaction members coaxial with the secondary member, means arranged to turn one of the reaction members at a constant speed higher than the rotational speed of the primary member, means operating to maintain the other reaction member at a constant speed less than the speed of the primary member, two identically wound helical clutch springs each secured at one end to a respective reaction member, the secondary member having two pairs of internal and external drum surfaces rigid therewith, respectively in common transverse planes, coils adjacent the free ends of each of the springs being radially interposed between the associated internal and external drum surfaces and normally in preloaded overrunning frictional relationship to the external drum surface, the same coils of each spring being movable into locking clutching relationship to the corresponding internal drum surface, a spring energizing collar constrained to turn with the secondary member while being movable axially thereof, the energizing collar having two sets of spring loaded slidable pins in guides parallel to the axis of the secondary member and adapted selectively to engage shoulders on the free end coils of respective springs circumferentially of the springs so as to cause expansion of said coils into locking clutching relationship to the associated internal drum surface, whereby the secondary member can be locked at rotational speeds greater and less than the rotational speed of the primary member.

5. In a machine tool adapted to cut screw threads, a rotary primary member which turns unidirectionally at a constant speed, a rotary secondary member in axial alignment with the primary member, one member supporting work and the other supporting a thread cutting tool, one of said members having a guide on which that member can move toward and away from the other member along the common axis of the members for enabling tool feed relative to the work, two reaction members coaxial with the secondary member, means arranged to turn one of the reaction members at a constant speed higher than the rotational speed of the primary member, means operating to maintain the other reaction member at a constant speed less than the speed of the primary member, two helical clutch springs each secured at one end to a respective reaction member, the secondary member having two circular clutch drums rigid therewith, coils adjacent the free ends of each of the springs being normally free from but movable into locking clutching relationship to respective drum surfaces, a spring energizing collar on the secondary member between the drums, the collar being constrained to turn with the secondary member while being movable axially thereof, the energizing collar having spring loaded pins in bores of the collar extending parallel to the axis of the secondary member, each of the pins having an end portion occupying a bore of the associated drum and movable in said bore whereby selectively to engage shoulders on the free end coils of respective springs circumferentially of the springs, for causing the secondary member to be locked through said clutch springs at rotational speeds greater and less than the rotational speed of the primary member, the arrangement being further characterized in that the bores for said pins in the collar have considerably greater clearance around the pins than do the bores in said clutch drums around the pins.

6. In a mechanism of the class described, a spindle of generally cylindrical form, bearing means supporting the spindle for rotation on a fixed axis, two spring clutch assemblies around and coaxial with the spindle, each assembly comprising a driving drum having a helical clutch spring secured thereto and a driven drum keyed or splined to the spindle and telescoped by free end coils of the clutch spring, which coils are normally out of gripping contact with the driven drums, the driving drums being journaled on the spindle on respective bushings embracing the spindle, the spindle having relatively opposed axial shoulders in tight axial abutment with respective bushings in directions to prevent axial separation of the bushings, and the bushings having first axial shoulders positioned for abutment with the driving drums in directions to limit axial relative separating movement of those drums, axially rigid means around the spindle between the driven drums and operative to maintain the driven drums in tight axial abutment with second axial shoulders of respective bushings axially opposed to the first shoulders, the effective lengths of the driving drums being sligthly less than the distance between the first and second shoulders of respective bushings, so that the mutually adjacent ends of the driving and driven drums are prevented from rubbing upon each other under substantial pressure, and selectively acting energizing means adapted for operative engagement with free end coils of the clutch springs, the energizing means being slidably supported on said rigid means between the driven drums.

7. In a machine tool, a rotary spindle, and driving means capable of establishing two speeds for the spindle, said means comprising two spring clutch assemblies each including a pair of drum members, one secured to turn with the spindle and the other freely journaled on the spindle, the freely journalled drums being connected respectively to the driving means, the drums of each pair having cylindrical pockets opposing each other to provide two pairs of internal and external drum surfaces, and a clutch spring anchored to the freely journaled drum in its pocket and having free end coils extending into the pocket of the spindle-secured drum and preloaded against one of the drum surfaces constituting its pocket, means connected to turn with the spindle and capable of selectively energizing each of the clutch springs out of its preloaded position and into gripping relationship with the other surface constituting its associated pocket, an axial duct in the spindle adapted to convey oil under substantial pressure during operation of the spindle, one drum of each clutch assembly having a radial duct communicating with its clutch spring pocket and with the duct of the spindle, and outlet passage means in one drum of each clutch assembly for egress of oil from the clutch spring pockets.

8. In a machine tool adapted to cut screw threads and comprising a rotary primary member which turns unidirectionally at a constant speed, a rotary secondary member in axial alignment with the sprimary member, one of said members rotatably supporting the work and the other rotatably supporting a thread cutting tool, one of said members having a guide on which that member can move toward and away from the other member along the common axis of the members for enabling tool feed relative to the work, two reaction members coaxial with the secondary member, means constantly operating to rotate one of the reaction members relative to the other, said means acting to maintain a constant overrunning and underrunning rotational speed relationship between respective reaction members and the primary member; the combination therewith of two helical clutch springs each secured at one end to a respective reaction member, the secondary member having two clutch drum surfaces rigid therewith each spaced radially from but in telescoping relationship with coils adjacent the free end of a respective spring, the said coils of each spring being movable into locking clutching relationship to its associated drum surface, spring energizing means turnable with the secondary member and capable of selective operative engagement with free end coils of the two springs at different times whereby, at one time, to cause said coils of one spring to move radially into locking frictional engagement with its associated drum surface for effecting overrunning of the secondary member relative to the primary member and, at another time, to cause said coils of the other spring so to move in respect to its associated drum surface for effecting an underrunning relationship between the secondary member and primary member, further characterized in that the clutch spring which causes said underrunning relationship to occur is in self energizing gripping relationship to a drum surface rigid with the secondary member prior to the time of energization of that clutch spring for effecting said underrunning relationship and immediately after said energization of that clutch spring is discontinued, whereby the secondary member is always strongly and undirectionally rotated by that clutch spring except when the other clutch spring is energized to effect the overrunning relationship mentioned.

References Cited in the file of this patent

UNITED STATES PATENTS

| | | |
|---|---|---|
| 1,805,998 | Schaerer | May 19, 1931 |
| 2,185,731 | Hubbell | Jan. 2, 1940 |
| 2,487,280 | Starkey | Nov. 8, 1949 |
| 2,603,324 | Pepper | July 15, 1952 |
| 2,622,450 | Gorske | Dec. 23, 1952 |